United States Patent
Fang et al.

(10) Patent No.: US 11,374,511 B2
(45) Date of Patent: Jun. 28, 2022

(54) METHOD FOR CONTROLLING A FAN, A SYSTEM, AND AN AIR CONDITIONER

(71) Applicants: Gree Electric Appliances (Wuhan) Co., Ltd, Wuhan (CN); Gree Electric Appliances, Inc. of Zhuhai, Zhuhai (CN)

(72) Inventors: Xiaobin Fang, Zhuhai (CN); Yuhai Su, Zhuhai (CN); Xiaolin He, Zhuhai (CN); Fengtao Sun, Zhuhai (CN); Tao Liu, Zhuhai (CN)

(73) Assignees: Gree Electric Appliances (Wuhan) Co., Ltd., Hubei (CN); Gree Electric Appliances, Inc. of Zhuhai, Guangdong (CN)

( * ) Notice: Subject to any disclaimer, the term of this patent is extended or adjusted under 35 U.S.C. 154(b) by 218 days.

(21) Appl. No.: 16/649,355

(22) PCT Filed: Aug. 30, 2018

(86) PCT No.: PCT/CN2018/103231
§ 371 (c)(1),
(2) Date: Mar. 20, 2020

(87) PCT Pub. No.: WO2019/056936
PCT Pub. Date: Mar. 28, 2019

(65) Prior Publication Data
US 2020/0224660 A1     Jul. 16, 2020

(30) Foreign Application Priority Data
Sep. 21, 2017  (CN) .......................... 201710861421.7

(51) Int. Cl.
*H02P 6/08*      (2016.01)
*F24F 11/32*     (2018.01)
(Continued)

(52) U.S. Cl.
CPC ............ *H02P 6/085* (2013.01); *F04D 19/002* (2013.01); *F04D 25/06* (2013.01); *F04D 27/001* (2013.01);
(Continued)

(58) Field of Classification Search
CPC . H02P 6/085; H02P 27/06; F24F 11/32; F24F 11/77; F04D 19/002; F04D 25/06;
(Continued)

(56) References Cited

U.S. PATENT DOCUMENTS

2017/0264216 A1    9/2017  Fu et al.
2018/0131305 A1*   5/2018  Wang .................... H02P 6/04

FOREIGN PATENT DOCUMENTS

CN    103954009 A    7/2014
CN    103968495 A    8/2014
(Continued)

OTHER PUBLICATIONS

Translation of CN 105071704 has been attached.*
Translation of JP2012100533 has been attached.*

*Primary Examiner* — Zoheb S Imtiaz
(74) *Attorney, Agent, or Firm* — The Webb Law Firm (57) ABSTRACT

Embodiments of the present disclosure provide a method for controlling a fan, a system, and an air conditioner. The method includes: turning off a first bridge arm group in an inverter of the fan; applying a preset driving signal to a second bridge arm group in the inverter; detecting an electrical signal of a stator of the fan after the preset driving signal is applied; determining an initial state of the fan according to the electrical signal of the stator of the fan, wherein the initial state of the fan includes a downwind forward state, a static start state, or an unwind reverse state; and providing the fan with a control signal matching the initial state of the fan according to the initial state of the fan.

14 Claims, 3 Drawing Sheets

(51) Int. Cl.
    *F24F 11/77*    (2018.01)
    *F04D 19/00*    (2006.01)
    *F04D 25/06*    (2006.01)
    *F04D 27/00*    (2006.01)
    *H02P 27/06*    (2006.01)

(52) U.S. Cl.
    CPC .............. *F24F 11/32* (2018.01); *F24F 11/77* (2018.01); *H02P 27/06* (2013.01); *F05B 2220/706* (2013.01); *F05B 2270/321* (2013.01); *F05B 2270/502* (2013.01); *F05B 2270/80* (2013.01)

(58) Field of Classification Search
    CPC .............. F04D 27/001; F05B 2220/706; F05B 2270/321; F05B 2270/502; F05B 2270/80
    See application file for complete search history.

(56) References Cited

FOREIGN PATENT DOCUMENTS

| | | | |
|---|---|---|---|
| CN | 104218857 | A | 12/2014 |
| CN | 104481907 | A | 4/2015 |
| CN | 104564754 | A | 4/2015 |
| CN | 105071704 | * | 11/2015 |
| CN | 105071704 | A | 11/2015 |
| CN | 107859645 | A | 3/2018 |
| JP | H08166158 | A | 6/1996 |
| JP | 2001128485 | A | 5/2001 |
| JP | 2012100533 | * | 5/2012 |
| JP | 2012100533 | A | 5/2012 |
| JP | 201313223 | A | 1/2013 |

\* cited by examiner

METHOD FOR CONTROLLING A FAN, A SYSTEM, AND AN AIR CONDITIONER

CROSS-REFERENCE TO RELATED APPLICATIONS

This application is the United States national phase of International Application No. PCT/CN2018/103231 filed Aug. 30, 2018, and claims priority to Chinese Patent Application No. 201710861421.7 filed Sep. 21, 2017, the disclosures of which are hereby incorporated by reference in their entirety.

BACKGROUND OF THE INVENTION

Field of the Invention

The present disclosure relates to the field of air conditioning technology, and in particular, to a method for controlling a fan, a system, and an air conditioner.

Description of Related Art

In the field of variable frequency air conditioner, an outdoor fan often comprises a variable frequency driver which comprises an uncontrollable rectifier. The bus voltage of the fan varies with input voltage, load and upwind reverse brake. An excessively high or low bus voltage is likely to result in abnormal shutdown of the fan. According to different ambient natural conditions, the fan usually comprises such three modes as upwind reverse start, downwind forward start and static start.

The upwind reverse start result in that the fan is in a "generator" state, and the energy is reversely charged to the DC bus, so that there is a rise in the bus voltage which is subjected to an excessively high abnormality. When the fan is in downwind forward start or static start, the bus voltage decreases as the load increases. In the case of a low-voltage input, it is likely to cause an excessively low abnormality of the bus voltage.

SUMMARY OF THE INVENTION

According to one aspect of embodiments of the present disclosure, a method for controlling a fan is provided. The method comprises: turning off a first bridge arm group in an inverter of the fan; applying a preset driving signal to a second bridge arm group in the inverter; detecting an electrical signal of a stator of the fan after the preset driving signal is applied; determining an initial state of the fan according to the electrical signal of the stator of the fan, wherein the initial state of the fan comprises a downwind forward state, a static start state, or an upwind reverse state; and providing the fan with a control signal matching the initial state of the fan according to the initial state of the fan.

In some embodiments, the first bridge arm group is an upper bridge arm group in the inverter, the second bridge arm group is a lower bridge arm group in the inverter, and the preset driving signal is a driving signal currently applied to the upper bridge arm group; or the first bridge arm group is a lower bridge arm group in the inverter, the second bridge arm group is an upper bridge arm group in the inverter, and the preset driving signal is a driving signal currently applied to the lower bridge arm group.

In some embodiments, the electrical signal of the stator of the fan is a current flowing through the stator of the fan, and the determining an initial state of the fan according to the electrical signal of the stator of the fan comprises: determining that the initial state of the fan is the downwind forward state when the electrical signal of the stator of the fan is greater than a preset threshold; determining that the initial state of the fan is the static start state when the electrical signal of the stator of the fan is equal to the preset threshold; and determining that the initial state of the fan is the upwind reverse state when the electrical signal of the stator of the fan is less than the preset threshold.

In some embodiments, the providing the fan with a control signal matching the initial state of the fan according to the initial state of the fan comprises: outputting a torque drive signal for providing a revolving torque to the fan, to switch the initial state of the fan to the static start state when the initial state of the fan is the upwind reverse state.

In some embodiments, the method further comprising: determining whether a current bus voltage of the fan is in a first preset interval when the initial state of the fan is the upwind reverse state; and performing a closed loop control on the current bus voltage of the fan if the current bus voltage of the fan is in the first preset interval.

In some embodiments, the providing the fan with a control signal matching the initial state of the fan according to the initial state of the fan comprises: performing a closed loop control on a rotation speed of the fan when the initial state of the fan is the downwind forward state.

In some embodiments, the method further comprising: determining whether a current bus voltage of the fan is in a second preset interval when the initial state of the fan is the downwind forward state; and performing a closed loop control on the current bus voltage of the fan if the current bus voltage of the fan is in the second preset interval.

In some embodiments, the providing the fan with a control signal matching the initial state of the fan according to the initial state of the fan comprises: determining whether a current bus voltage of the fan is less than a preset voltage amplitude when the initial state of the fan is the static start state; and performing a closed loop control on the current bus voltage of the fan if the current bus voltage of the fan is less than the preset voltage amplitude.

According to another aspect of embodiments of the present disclosure, a system for controlling a fan is provided. The system comprises: a power module configured to connect to the fan, and comprising a first bridge arm group and a second bridge arm group; a capacitor bank connected between the power module and a power supply; and a fan control device connected to the power module and the capacitor bank respectively; wherein the fan control device is configured to turn off the first bridge arm group, apply a preset driving signal to the second bridge arm group, detect electrical signals of the power module and the capacitor bank, determine an initial state of the fan according to the electrical signals of the power module and the capacitor bank, and provide the power module with a control signal matching the initial state of the fan according to the initial state of the fan, wherein the initial state of the fan comprises a downwind forward state, a static start state, or an upwind reverse state.

In some embodiments, the fan control device comprises a control switch, which is configured to switch between a first control loop and a second control loop according to the initial state of the fan, wherein the first control loop is a closed loop control loop of a bus voltage, and the second control loop is a rotation speed control loop.

According to still another aspect of an embodiment of the present disclosure, an air conditioner is provided. The air conditioner comprises a fan and the system described in any of the above embodiments.

DESCRIPTION OF THE INVENTION

Exemplary embodiments will be described in detail here, examples of which are illustrated in the accompanying drawings. When the following description relates to the accompanying drawings, the same numerals in different accompanying drawings represent the same or similar elements unless otherwise indicated. The implementations described in the following exemplary embodiments do not represent all the implementations consistent with the present disclosure. By contrary, they are merely examples of devices and methods consistent with some aspects of the present disclosure, as detailed in the appended claims.

For the abnormal phenomenon that the bus voltage is excessively high or low, methods known to the inventor of the present disclosure are as follows.

Figure 1:
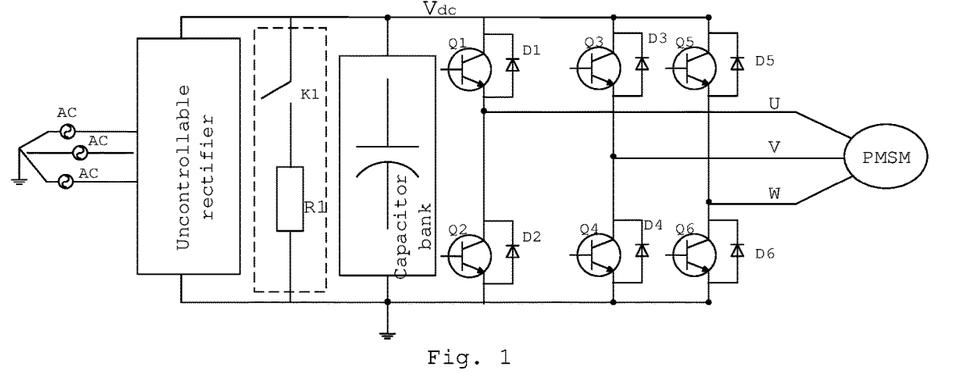
FIG. 1 is a schematic view of a bus voltage control circuit known to the inventor of the present disclosure.

(1) Referring to FIG. 1, the bus voltage is excessively high resulting from upwind reverse start of the fan. A typical solution is to add a brake circuit. When the energy is reversely charged to the DC bus and rises to a certain value, the switch K1 is pulled in, and the energy is consumed within the resistor R1. The switch K1 does not break until the bus voltage is lower than a certain value. Therefore, the bus can be in a normal operative state. The advantage of this solution is that, it is possible to perform rapid braking and energy consumption. The disadvantages are that: additional switches and resistors increase the cost and reduce the reliability, the software often make an error determination in detecting whether a control threshold is reached, and an additional radiation system is required for radiating the heat of the resistor.

(2) When the fan is operated in downwind forward start or static start, as the load increases, the bus voltage decreases. The software usually limits the rise of the fan frequency according to a low threshold of the bus voltage, thereby limiting the increase of the load and the decrease of the bus voltage. The disadvantage of this solution is that, under a low-voltage input condition, it is likely to reduce the load of the fan, so that a required air volume cannot be reached, thereby resulting in that the overall performance is worsened.

Therefore, how to reduce abnormal faults in the bus voltage and enhance the overall performance has become an urgent technical problem to be solved.

Figure 2:
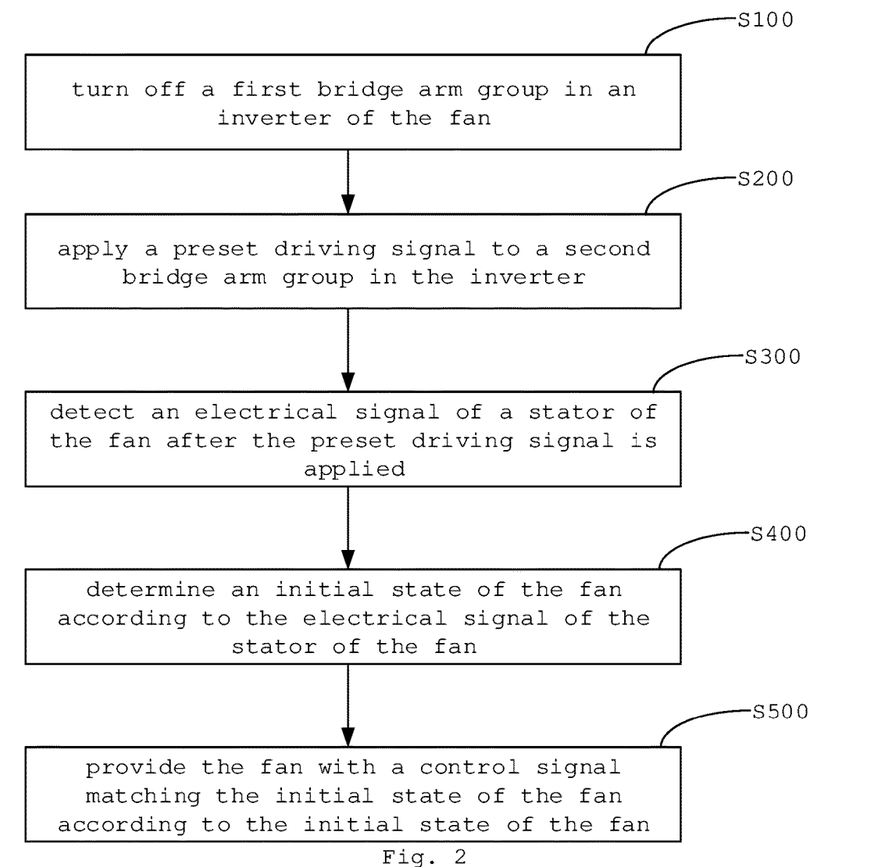
FIG. 2 is a flow chart of a method for controlling a fan according to some embodiments of the present disclosure.

In order to reduce abnormal faults in the bus voltage and improve the overall performance of the air conditioner, a method for controlling a fan is provided in some embodiments of the present disclosure. Referring to FIG. 2 which is a flow chart of the method, the method comprises the following steps S100 to S500.

Figure 3:
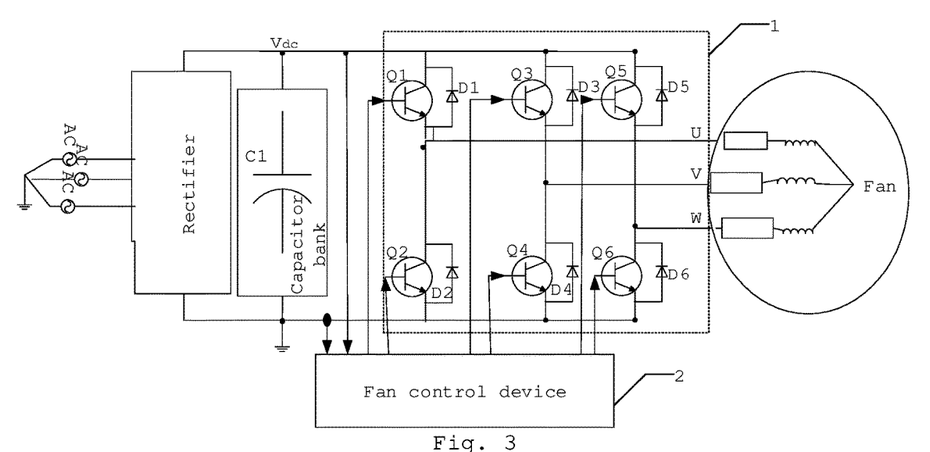
FIG. 3 is a schematic view of circuit principles of a system for controlling a fan according to some embodiments of the present disclosure.

In step S100, the first bridge arm group in the inverter of the fan is turned off. Referring to FIG. 3 which is a schematic view of circuit principles of a system for controlling a fan according to some embodiments of the present disclosure, the system comprises a power module 1 connected to the fan, wherein the power module 1 comprises a first bridge arm group and a second bridge arm group. In some embodiments, the first bridge arm group is an upper bridge arm group, and correspondingly, the second bridge arm group is a lower bridge arm group. In other embodiments, the first bridge arm group is a lower bridge arm group, and correspondingly, the second bridge arm group is an upper bridge arm group. In some embodiments, the upper bridge arm group comprises triodes Q1, Q3, and Q5 and diodes D1, D3, and D5, and the lower arm group comprises triodes Q2, Q4, and Q6, and diodes D2, D4, and D6.

In step S200, a preset driving signal is applied to the second bridge arm group in the inverter. In some embodiments of the present disclosure, the preset driving signal is a driving signal currently applied to the second bridge arm group. In one embodiment, the first bridge arm group is an upper bridge arm group in the inverter, the second bridge arm group is a lower bridge arm group in the inverter, and the preset driving signal is a driving signal currently applied to the lower bridge arm group. In another embodiment, the first bridge arm group is a lower bridge arm group in the inverter, the second bridge arm group is an upper bridge arm group in the inverter, and the preset driving signal is a driving signal currently applied to the upper bridge arm group.

In step S300, an electrical signal of a stator of the fan is detected after the preset driving signal is applied. In some embodiments of the present disclosure, the electrical signal of the stator of the fan is a current of the stator of the fan. In some embodiments, there will be a current flowing through the stator of the fan if the electric motor of the fan has a certain initial speed. The initial state of the fan can be determined from a relation to $\omega = f(i_{u,\,v,\,w})$ between the detected current and rotation speed of the fan, wherein-O) is a rotation speed of the fan, $i_{u,\,v,\,w}$ is the three-phase current of the stator of the fan.

In step S400, the initial state of the fan is determined according to the electrical signal of the stator of the fan. In the embodiments of the present disclosure, the initial state of the fan comprises a downwind forward state, a static start state, or an upwind reverse state. Since the current flowing through the stator of the fan has a different magnitude in different initial states, the initial state of the fan can be determined according to the magnitude of the current of the stator of the fan. In some embodiments, when the electrical signal of the stator of the fan is greater than a preset threshold, it is determined that the initial state of the fan is a downwind forward state; when the electrical signal of the stator of the fan is equal to the preset threshold, it is determined that the initial state of the fan is a static start state; and when the electrical signal of the stator of the fan is less than a preset threshold, it is determined that the initial state of the fan is an upwind reverse state. That is, when the current of the stator of the fan $i_{u,\,v,\,w} > I_0$, the rotation speed of the fan $\omega > 0$, and it is determined that the fan is in a downwind forward state; when the current of the stator of the fan $i_{u,\,v,\,w} = I_0$, the rotation speed of the fan $\omega = 0$, it is determined that the fan is in a static starting state; and when the current of the stator of the fan $i_{u,\,v,\,w}<I_0$, the rotation speed of the fan $\omega<0$, and it is determined that the fan is in an upwind reverse state, wherein $I_0$ is a critical current value of downwind forward state, static state, and upwind reverse state, and the magnitude of $I_0$ can be determined according to empirical or theoretical derivation. It should be noted that, during implementation of the embodiments of the present disclosure, a certain error is allowed in the critical current value $I_0$, that is, the values near the critical current value $I_0$ is regarded as critical values, and the magnitude of the error is determined based on experience.

Figure 4:
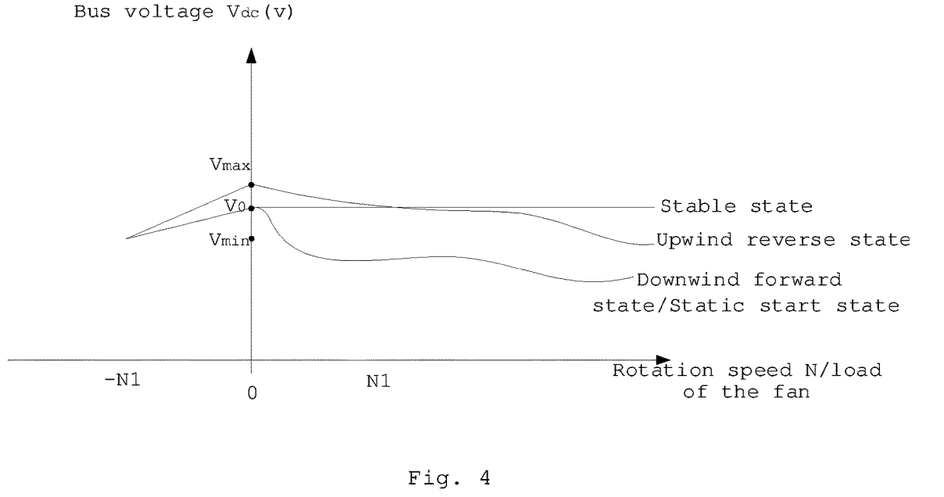
FIG. 4 is a schematic view of the bus voltage variation trends in different initial states in some embodiments of the present disclosure.

In step S500, a control signal matching the initial state of the fan is provided to the fan according to the initial state of the fan. Referring to FIG. 4 which is a schematic view of the bus voltage variation trends in different initial states in some embodiments of the present disclosure, the bus voltage in the three start modes are different from the bus voltage in a stable operation mode. In the embodiments of the present disclosure, different control modes are used for different initial states. The fan braking control manner will be called if a reverse state of the fan is identified; the static start control mode will be called if a static state of the fan is identified, and the forward start control model will be called if a forward state of the fan is identified.

In some embodiments, when the step S500 is performed, a control signal matching the initial state of the fan is provided to the fan according to the initial state of the fan, which comprises: a torque drive signal for providing a revolving torque to the fan, to switch the initial state of the fan to a static start state when the initial state of the fan is an upwind reverse state. For example, when the fan is operated in reverse start, outputting a certain revolving torque $T_e(t)$ to the fan first is needed. In some embodiments, the magnitude of the revolving torque output to the fan is determined according to the speed of the fan and the relation $$T_e(t) = J\frac{d\omega}{dt} + T_l(t) + B\omega,$$

wherein $T_e(t)$ is a revolving torque output to the fan, $T_l(t)$ is a revolving torque of the load, J is a moment of inertia of the fan, B is a damping coefficient, and w is a rotation speed of the fan.

Figure 5:
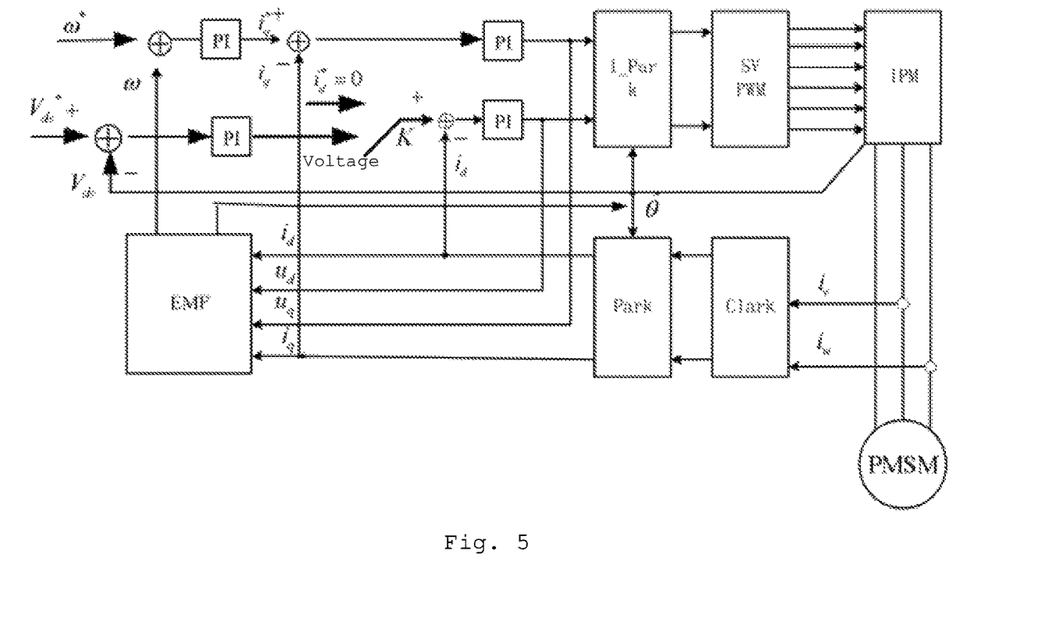
FIG. 5 is a schematic view of the circuit structure of a fan control device according to some embodiments of the present disclosure.

During down-converting operation of the fan from the reverse speed of −N1 rad/min to the rotation speed reduced to 0 rad/min, the fan is in a "generator" state, and the energy of the fan is reversely charged to the bus, so that the bus voltage is always on a rise. In order to prevent the bus voltage from an excessively high value, in some embodiments, the method further comprises: when the initial state of the fan is an upwind reverse state, it is determined whether the current bus voltage of the fan is in a first preset interval; the current bus voltage of the fan is in a closed loop control if the current bus voltage of the fan is in the first preset interval. In some embodiments of the present disclosure, the first preset interval is $[V_{max}-V_1, V_{max}]$, where $V_1$ is a residual voltage under a normal condition of a voltage protection value of the bus. FIG. 5 shows a schematic view of the circuit structure of a fan control device according to some embodiments of the present disclosure. Referring to FIGS. 3 and 5, in these embodiments, the control switch K is switched to a voltage stage, so that the fan control device works under the voltage $V_{dc}$ of the outer loop and the current $i_d$ of the inner loop, and double closed loop control of the DC bus voltage is realized by the PI regulator, so as to stabilize the control of the bus voltage, and suppress the rise of the bus voltage resulting from the reverse of the fan to a specified value. At the same time, part of the energy is consumed on the three-phase windings $R_u$, $R_v$, $R_w$ of the stator of the motor, and part of the energy is stored within the capacitor bank C1, so that the normal operation control of the electric motor will not be affected. When the fan is reversely braked to 0 rad/min, the reverse braking control of the fan is completed. Then, the fan is in a static start state. When the fan is in a static start state, the fan control device works at the rotation speed $\omega$ of the outer loop and the current $i_q$ of the inner loop, and double closed loop control of the rotation speed $\omega$ of the fan is realized by the PI regulator, so as to stabilize the control of the rotation speed of the fan. After the start of the fan is completed, it will enter stable control of the bus voltage again if the voltage threshold control conditions of the bus are met. The entire control process implements parallel control of the bus voltage and the rotation speed of the fan.

In some embodiments, when the step S500 is performed, a control signal matching the initial state is provided to the fan according to the initial state of the fan, which comprises: when the initial state of the fan is a downwind forward state, the rotation speed of the fan is in a closed loop control. When the fan is in a downwind forward state, there is no energy reversely charged to the DC bus, so that the bus voltage will not increase. Therefore, a conventional FOC (field-oriented control) control manner of the electric motor can be adopted, and the switch K is pulled in to a current stage to implement a conventional FOC control of the electric motor, and a closed loop control of the rotation speed of the electric motor, wherein $i_d^*=0$, and $i_d^*$ is a pre-given current of the electric motor of the inner loop.

As the load increases, the bus voltage gradually decreases. Particularly under low-voltage power input conditions, as the load increases, the bus voltage decreases to a certain threshold, which usually limit the increase of the load and even reduce the load of the fan. Therefore, the bus voltage in a normal range is needed, so as to avoid a reduced property of the assembly. In some embodiments of the present disclosure, the method further comprises: when the initial state of the fan is a downwind forward state, it is determined whether the current bus voltage of the fan is in a second preset interval; the current bus voltage of the fan is in a closed loop control if the current bus voltage of the fan is in the second preset interval. In some embodiments, when the bus voltage $V_{dc}$ is in the second preset interval $[V_{min}, V_{min}+V_1]$, the switch K is pulled in to the voltage stage, thereby implementing parallel operation of stable control of the bus voltage $V_{dc}=V_{min}+V_1$ and FOC control of the current $i_q^*$ of the electric motor, wherein $i_q^*$ is a pre-given current of the electric motor of the inner loop. When the bus voltage $V_{dc}$ is greater than $V_{min}+V_1$, the switch K is pulled in to the voltage stage, thereby implementing FOC control of the current $i_q^*$ of the electric motor, wherein $V_{min}$ is a protection threshold against excessively low bus voltage.

In some embodiments, when the step S500 is performed, a control signal matching the initial state of the fan is provided to the fan according to the initial state of the fan, which comprises: when the initial state of the fan is a static start state, it is determined whether the current bus voltage of the fan is less than a preset voltage amplitude; the current bus voltage of the fan is in a closed loop control if the current bus voltage of the fan is less than a preset voltage amplitude. In some embodiments, when the bus voltage $V_{dc}<V_{min}+V_1$, the switch K is pulled in to the voltage stage, thereby implementing parallel operation of stable control of the bus voltage $V_{dc}=V_{min}+V_1$ and FOC control of the current $i_q^*$ of the electric motor.

In some embodiments of the present disclosure, a system for controlling a fan is provided. Referring to FIG. 3 which is a schematic view of circuit principles of the system according to some embodiments of the present disclosure, the system comprises a power module 1, a capacitor bank C1, and a fan control device 2.

The power module 1 comprises a first bridge arm group and a second bridge arm group. The power module 1 is connected to the fan. In some embodiments, the first bridge arm group is an upper bridge arm group, and correspondingly, the second bridge arm group is a lower bridge arm group. In other embodiments, the first bridge arm group is a lower bridge arm group, and correspondingly, the second bridge arm group is an upper bridge arm group. In some embodiments, the upper bridge arm group comprises triodes Q1, Q3, and Q5 and diodes D1, D3, and D5, and the lower arm group comprises triodes Q2, Q4, and Q6, and diodes D2, D4, and D6.

The capacitor bank C1 is connected between the power module 1 and a power supply. In some embodiments, both ends of the capacitor bank C1 are connected between the bus bar and the ground wire. In some embodiments, a rectifier is connected between the power supply and the capacitor bank C1 to rectify the power supply.

The fan control device 2 is connected to the power module 1 and the capacitor bank C1 respectively. In the embodiments of the present disclosure, the fan control device 2 is configured to turn off the first bridge arm group, apply a preset driving signal to the second bridge arm group, detect the electrical signals of the power module 1 and the capacitor bank C1, determine the initial state of the fan according to the electrical signals of the power module 1 and the capacitor bank C1, and provide the power module 1 with a control signal that matches the initial state of the fan according to the initial state of the fan, wherein the initial state of the fan comprises the downwind forward state, the static start state, or the upwind reverse state.

In some embodiments, referring to FIG. 5, the fan control device 2 comprises a control switch K, which is configured to switch between the first control loop and the second control loop according to the initial state of the fan, wherein the first control loop is a closed loop control loop of the bus voltage, and the second control loop is a rotation speed control loop. In some embodiments, the fan control device 2 comprises a conventional FOC rotation speed control loop as the inner loop, and a current control loop and a bus voltage control loop as the outer loop. When the control switch K is pulled in to the voltage stage, a closed loop control of the bus voltage will be realized; when the control switch K is pulled in to the current stage, a closed loop control of the current of the stator of the electric motor will be realized, wherein $i_q^*=0$.

In some embodiments of the present disclosure, an air conditioner is provided. The air conditioner comprises a fan and the system disclosed in the above-described embodiments.

In the present disclosure, by turning off the first bridge arm group and applying a preset driving signal to the second bridge arm group, an electric signal related to the initial state of the fan can be detected. Since the initial state of the fan can be determined according to the electric signal, it is possible to provide the fan with a control signal that matches the initial state. Therefore, it is possible to be more targeted in fan control, and it is possible to improve the accuracy of the control, and in turn reduce the abnormal faults in the bus voltage and improve the overall performance.

Those skilled in the art will readily contemplate other implementation solutions of the present disclosure after considering the specification and practicing the application disclosed here. The present disclosure is intended to cover any variation, use, or adaptive change of the present invention, which follows general principles of the present disclosure and comprise common knowledge or conventional technical means in the art that has not been filed in the present disclosure. The specification and embodiments are only considered as exemplary only, with an actual scope and spirit of the disclosure as indicated by the following claims.

It should be understood that, the present disclosure is not limited to an accurate structure that has been described above and illustrated in the accompanying drawings, and various modifications and changes may be made without departing from the scope thereof. The scope of the present disclosure is only limited by the appended claims.

What is claimed is:

1. A method for controlling a fan, comprising:
turning off a first bridge arm group in an inverter of the fan;
applying a preset driving signal to a second bridge arm group in the inverter;
detecting an electrical signal of a stator of the fan after the preset driving signal is applied;
determining an initial state of the fan according to the electrical signal of the stator of the fan, wherein the initial state of the fan comprises a downwind forward state, a static start state, or an upwind reverse state; and
providing the fan with a control signal matching the initial state of the fan according to the initial state of the fan, comprising:
outputting a torque drive signal for providing a revolving torque to the fan, to switch the initial state of the fan to the static start state when the initial state of the fan is the upwind reverse state;
determining whether a current bus voltage of the fan is in a first preset internal when the initial state of the fan is the upwind reverse state, where the first preset interval is determined from a residual voltage under a normal condition of a voltage protection value of a bus; and
performing a closed loop control on the current bus voltage of the fan if the current bus voltage of the fan is in the first preset interval, wherein a control switch is switched to a voltage stage, so that a fan control device works under a voltage of an outer loop and a current of an inner loop, and double closed loop control of DC bus voltage is realized by a PI regulator, so as to stabilize the control of the bus voltage, and suppress a rise of the bus voltage resulting from the reverse of the fan to a specified value.

2. The method according to claim 1, wherein the first bridge arm group is an upper bridge arm group in the inverter, the second bridge arm group is a lower bridge arm group in the inverter, and the preset driving signal is a driving signal currently applied to the lower bridge arm group; or
the first bridge arm group is a lower bridge arm group in the inverter, the second bridge arm group is an upper bridge arm group in the inverter, and the preset driving signal is a driving signal currently applied to the upper bridge arm group.

3. The method according to claim 1, wherein the electrical signal of the stator of the fan is a current flowing through the stator of the fan, and the determining an initial state of the fan according to the electrical signal of the stator of the fan comprises:

determining that the initial state of the fan is the downwind forward state when the electrical signal of the stator of the fan is greater than a preset threshold;

determining that the initial state of the fan is the static start state when the electrical signal of the stator of the fan is equal to the preset threshold; and determining that the initial state of the fan is the upwind reverse state when the electrical signal of the stator of the fan is less than the preset threshold.

4. The method according to claim 1, wherein the providing the fan with a control signal matching the initial state of the fan according to the initial state of the fan comprises: performing a closed loop control on a rotation speed of the fan when the initial state of the fan is the downwind forward state.

5. The method according to claim 4, further comprising:

determining whether a current bus voltage of the fan is in a second preset interval when the initial state of the fan is the downwind forward state, wherein the second preset interval is determined from the residual voltage under a normal condition of a voltage protection value of the bus and a protection threshold against excessively low bus voltage; and performing a closed loop control on the current bus voltage of the fan if the current bus voltage of the fan is in the second preset interval, wherein the control switch is pulled into the voltage stage, thereby implementing parallel operation of stable control of the bus voltage and field-oriented control (FOC) control of a pre-given current of an electric motor of the inner loop.

6. The method according to claim 1, wherein the providing the fan with a control signal matching the initial state of the fan according to the initial state of the fan comprises:

determining whether a current bus voltage of the fan is less than a preset voltage amplitude when the initial state of the fan is the static start state, wherein the preset voltage amplitude is determined from the residual voltage under a normal condition of a voltage protection value of the bus and a protection threshold against excessively low bus voltage; and performing a closed loop control on the current bus voltage of the fan if the current bus voltage of the fan is less than the preset voltage amplitude, wherein the control switch is pulled into the voltage stage, thereby implementing parallel operation of stable control of the bus voltage and field-oriented control (FOC) control of a pre-given current of an electric motor.

7. A system for controlling a fan, comprising:

a power module configured to connect to the fan, and comprising a first bridge arm group and a second bridge arm group;

a capacitor bank connected between the power module and a power supply; and a fan control device connected to the power module and the capacitor bank respectively;

wherein the fan control device is configured to perform a method for controlling a fan, the method comprising:

turning off the first bridge arm group;

applying a preset driving signal to the second bridge arm group;

detecting electrical signals of the power module and the capacitor bank;

determining an initial state of the fan according to the electrical signals of the power module and the capacitor bank; and providing the power module with a control signal matching the initial state of the fan according to the initial state of the fan, wherein the initial state of the fan comprises a downwind forward state, a static start state, or an upwind reverse state, the providing comprising:

outputting a torque drive signal for providing a revolving torque to the fan, to switch the initial state of the fan to the static start state when the initial state of the fan is the upwind reverse state;

determining whether a current bus voltage of the fan is in a first preset interval when the initial state of the fan is the upwind reverse state, where the first preset interval is determined from a residual voltage under a normal condition of a voltage protection value of a bus; and performing a closed loop control on the current bus voltage of the fan if the current bus voltage of the fan is in the first preset interval, wherein a control switch is switched to a voltage stage, so that a fan control device works under a voltage of an outer loop and a current of an inner loop, and double closed loop control of DC bus voltage is realized by a PI regulator, so as to stabilize the control of the bus voltage, and suppress a rise of the bus voltage resulting from the reverse of the fan to a specified value.

8. The system according to claim 7, wherein the control switch is configured to switch between a first control loop and a second control loop according to the initial state of the fan, wherein the first control loop is a closed loop control loop of a bus voltage, and the second control loop is a rotation speed control loop.

9. An air conditioner comprising a fan and the system according to claim 7.

10. A method for controlling a fan, comprising:

turning off a first bridge arm group in an inverter of the fan;

applying a preset driving signal to a second bridge arm group in the inverter;

detecting an electrical signal of a stator of the fan after the preset driving signal is applied;

determining an initial state of the fan according to the electrical signal of the stator of the fan, wherein the initial state of the fan comprises a downwind forward state, a static start state, or an upwind reverse state; and providing the fan with a control signal matching the initial state of the fan according to the initial state of the fan, comprising: performing a closed loop control on the current bus voltage of the fan pulling a control switch into the voltage stage, thereby implementing parallel operation of stable control of the bus voltage and field-oriented control (FOC) control of a pre-given current of an electric motor.

11. The method according to claim 10, wherein the providing the fan with a control signal matching the initial state of the fan according to the initial state of the fan comprises: performing a closed loop control on a rotation speed of the fan when the initial state of the fan is the downwind forward state.

12. The method according to claim 11, further comprising:

determining whether a current bus voltage of the fan is in a second preset interval when the initial state of the fan is the downwind forward state, wherein the second preset interval is determined from the residual voltage under a normal condition of a voltage protection value of the bus and a protection threshold against excessively low bus voltage; and performing the closed loop control on the current bus voltage of the fan if the current bus voltage of the fan is in the second preset interval.

13. The method according to claim 10, wherein the providing the fan with a control signal matching the initial state of the fan according to the initial state of the fan comprises:

determining whether a current bus voltage of the fan is less than a preset voltage amplitude when the initial state of the fan is the static start state, wherein the preset voltage amplitude is determined from the residual voltage under a normal condition of a voltage protection value of the bus and a protection threshold against excessively low bus voltage; and performing the closed loop control on the current bus voltage of the fan if the current bus voltage of the fan is less than the preset voltage amplitude.

14. A system for controlling a fan, comprising:

a power module configured to connect to the fan, and comprising a first bridge arm group and a second bridge arm group;

a capacitor bank connected between the power module and a power supply; and a fan control device connected to the power module and the capacitor bank respectively;

wherein the fan control device is configured to perform the method for controlling a fan according to claim 10.

* * * * *

UNITED STATES PATENT AND TRADEMARK OFFICE
CERTIFICATE OF CORRECTION

| | | |
|---|---|---|
| PATENT NO. | : 11,374,511 B2 | Page 1 of 1 |
| APPLICATION NO. | : 16/649355 | |
| DATED | : June 28, 2022 | |
| INVENTOR(S) | : Xiaobin Fang et al. | |

It is certified that error appears in the above-identified patent and that said Letters Patent is hereby corrected as shown below:

On the Title Page

Column 2, Abstract, Line 10, Delete "unwind" and insert -- upwind --

In the Claims

Column 8, Line 41, Claim 1, Delete "internal" and insert -- interval --

Signed and Sealed this
Twenty-third Day of August, 2022

*Katherine Kelly Vidal*

Katherine Kelly Vidal
*Director of the United States Patent and Trademark Office*